(12) United States Patent
Fahimi et al.

(10) Patent No.: US 8,248,829 B2
(45) Date of Patent: Aug. 21, 2012

(54) METHODS AND SYSTEMS FOR PHASE CURRENT RECONSTRUCTION OF AC DRIVE SYSTEMS

(75) Inventors: Babak Fahimi, Arlington, TX (US); Wei Jiang, Yangzhou (CN)

(73) Assignee: Board of Regents, The University of Texas System, Austin, TX (US)

( * ) Notice: Subject to any disclaimer, the term of this patent is extended or adjusted under 35 U.S.C. 154(b) by 346 days.

(21) Appl. No.: 12/772,199

(22) Filed: May 1, 2010

(65) Prior Publication Data

US 2011/0110138 A1   May 12, 2011

Related U.S. Application Data

(60) Provisional application No. 61/174,686, filed on May 1, 2009.

(51) Int. Cl.
*H02M 7/44* (2006.01)
*H02M 7/5387* (2007.01)

(52) U.S. Cl. .......................................... 363/98; 363/132

(58) Field of Classification Search .................... 363/37, 363/39–41, 74, 78–79, 98, 132
See application file for complete search history.

(56) References Cited

U.S. PATENT DOCUMENTS

| | | | |
|---|---|---|---|
| 5,604,385 A * | 2/1997 | David ............................. 307/52 |
| 6,397,155 B1 * | 5/2002 | Przydatek et al. .............. 702/61 |
| 6,984,953 B2 | 1/2006 | Quirion et al. |
| 7,102,327 B2 | 9/2006 | Ho |
| 7,348,757 B2 | 3/2008 | Takahashi |
| 7,620,524 B2 * | 11/2009 | Frey et al. ..................... 702/189 |
| 7,893,650 B2 * | 2/2011 | Arnet ............................ 318/811 |
| 8,072,177 B2 * | 12/2011 | Arisawa ........................ 318/685 |
| 2006/0138994 A1 * | 6/2006 | Cheng ........................... 318/807 |
| 2010/0148753 A1 * | 6/2010 | Ha et al. ........................ 324/107 |

* cited by examiner

*Primary Examiner* — Gary L Laxton
*Assistant Examiner* — Henry Lee, III
(74) *Attorney, Agent, or Firm* — Chowdhury & Georgakis, P.C.

(57) ABSTRACT

Methods and systems for phase current reconstruction are disclosed. An example method comprises: sampling a current from a power stage comprising: three phase legs, a current sensor to measure a dc-link current, and three more current sensors configured to measure three summations of currents for the power stage, storing the sampled current into a current stack if the sampled current comes from a survived sensor and is one of the phase currents from the switching state in the state stack, and reconstructing an unknown phase current by using the previously stored currents along with the sampled current to calculate the unknown phase current. Other embodiments are described and claimed.

22 Claims, 8 Drawing Sheets

METHODS AND SYSTEMS FOR PHASE CURRENT RECONSTRUCTION OF AC DRIVE SYSTEMS

CROSS REFERENCE TO RELATED APPLICATIONS

This application claims the benefit of the filing date of U.S. provisional patent application No. 61/174,686, incorporated herein by reference, which was filed on May 1, 2009, by the same inventors of this application.

FIELD OF THE INVENTION

The present invention generally relates to phase current reconstruction of alternating current (AC) drive systems. More particularly, the invention relates to methods and systems for model-independent current reconstruction based on space vector modulation.

BACKGROUND OF THE INVENTION

The embodiment described herein relates generally to the field of phase current reconstruction of AC drive systems in high-performance multi-phase pulse-width-modulated (PWM) converter systems used in generator and motor drives, particularly under the single-survived-sensor ($S^3$) scenario.

Conventional methods and systems for phase current reconstruction of AC drive systems during current sensor failure mainly focus on sensor redundancy in order to overcome the hazards and disastrous consequences of sensor failure resulting from interrupted system performance, especially under the $S^3$ scenario. Sensor redundancy however leads to an undesirable increase in size and cost as a result of the increased number of sensors and their conditioning circuits.

The embodiment or embodiments described herein may solve the fault tolerant system problem as well as others by proposing novel, model-independent current reconstruction methods and systems for three-phase PWM converter systems based on space vector modulation.

SUMMARY

In one respect, disclosed is a three-phase pulse-width-modulated (PWM) converter system comprising: a power stage comprising a first a first phase leg comprising an upper switch and a lower switch, a second phase leg comprising an upper switch and a lower switch, a third phase leg comprising an upper switch and a lower switch, a first current sensor configured to measure a dc-link current, a second current sensor, wherein the second current sensor is configured to measure the current in the first leg plus the current in the second leg, the current in the upper switch of the first phase leg plus the current in the upper switch of the second phase leg, the current in the lower switch of the first phase leg plus the current in the lower switch of the second phase leg, the current in the upper switch of the first phase leg plus the current in the lower switch of the second phase leg, or the current in the lower switch of the first phase leg plus the current in the upper switch of the second phase leg, a third current sensor, wherein the third current sensor is configured to measure the current in the second leg plus the current in the third leg, the current in the upper switch of the second phase leg plus the current in the upper switch of the third phase leg, the current in the lower switch of the second phase leg plus the current in the lower switch of the third phase leg, the current in the upper switch of the second phase leg plus the current in the lower switch of the third phase leg, the current in the upper switch of the second phase leg plus the current in the lower switch of the third phase leg, or the current in the lower switch of the second phase leg plus the current in the upper switch of the third phase leg, and a fourth current sensor, wherein the fourth current sensor is configured to measure the current in the first leg plus the current in the third leg, the current in the upper switch of the first phase leg plus the current in the upper switch of the third phase leg, the current in the lower switch of the first phase leg plus the current in the lower switch of the third phase leg, the current in the upper switch of the first phase leg plus the current in the lower switch of the third phase leg, or the current in the lower switch of the first phase leg plus the current in the upper switch of the third phase leg, and a control logic configured to sample a current from the power stage, store a switching state in a state stack, store the sampled current into a current stack if the sampled current comes from a survived sensor and is one of the phase currents from the switching state in the state stack, and reconstruct an unknown phase current by using the previously stored currents along with the sampled current to calculate the unknown phase current.

In another respect, disclosed is a method for phase current reconstruction, the method comprising: sampling a current from a power stage comprising a first phase leg comprising an upper switch and a lower switch, a second phase leg comprising an upper switch and a lower switch, a third phase leg comprising an upper switch and a lower switch, a first current sensor configured to measure a dc-link current, a second current sensor, wherein the second current sensor is configured to measure the current in the first leg plus the current in the second leg, the current in the upper switch of the first phase leg plus the current in the upper switch of the second phase leg, the current in the lower switch of the first phase leg plus the current in the lower switch of the second phase leg, the current in the upper switch of the first phase leg plus the current in the lower switch of the second phase leg, or the current in the lower switch of the first phase leg plus the current in the upper switch of the second phase leg, a third current sensor, wherein the third current sensor is configured to measure the current in the second leg plus the current in the third leg, the current in the upper switch of the second phase leg plus the current in the upper switch of the third phase leg, the current in the lower switch of the second phase leg plus the current in the lower switch of the third phase leg, the current in the upper switch of the second phase leg plus the current in the lower switch of the third phase leg, or the current in the lower switch of the second phase leg plus the current in the upper switch of the third phase leg, and a fourth current sensor, wherein the fourth current sensor is configured to measure the current in the first leg plus the current in the third leg, the current in the upper switch of the first phase leg plus the current in the upper switch of the third phase leg, the current in the lower switch of the first phase leg plus the current in the lower switch of the third phase leg, the current in the upper switch of the first phase leg plus the current in the lower switch of the third phase leg, or the current in the lower switch of the first phase leg plus the current in the upper switch of the third phase leg, storing a switching state in a state stack, storing the sampled current into a current stack if the sampled current comes from a survived sensor and is one of the phase currents from the switching state in the state stack, and reconstructing an unknown phase current by using the previously stored currents along with the sampled current to calculate the unknown phase current.

In yet another embodiment, disclosed is an N phase PWM converter system comprising: a power stage comprising N phase legs, each phase leg comprising an upper switch and a lower switch, where N is greater than 2, a first current sensor configured to measure a dc-link current, N current sensors configured to measure N summations of currents for the power stage, and control logic configured to perform operations comprising: sampling a current from one of the current sensors, storing a switching state of the power stage in a state stack, automatically determining whether the sampled current comes from a survived sensor, automatically determining whether the sampled current is one of the phase currents from the switching state in the state stack, in response to determinations that the sampled current comes from a survived sensor and the sampled current is one of the phase currents from the switching state in the state stack, automatically storing the sampled current into a current stack, and reconstructing an unknown phase current by using one or more of the previously stored currents along with the sampled current to calculate the unknown phase current.

Numerous additional embodiments are also possible.

BRIEF DESCRIPTION OF THE DRAWINGS

Features and advantages of the present invention will become apparent from the appended claims, the following detailed description of one or more example embodiments, and the corresponding figures.

DETAILED DESCRIPTION OF ONE OR MORE EMBODIMENTS

Figure 1A:
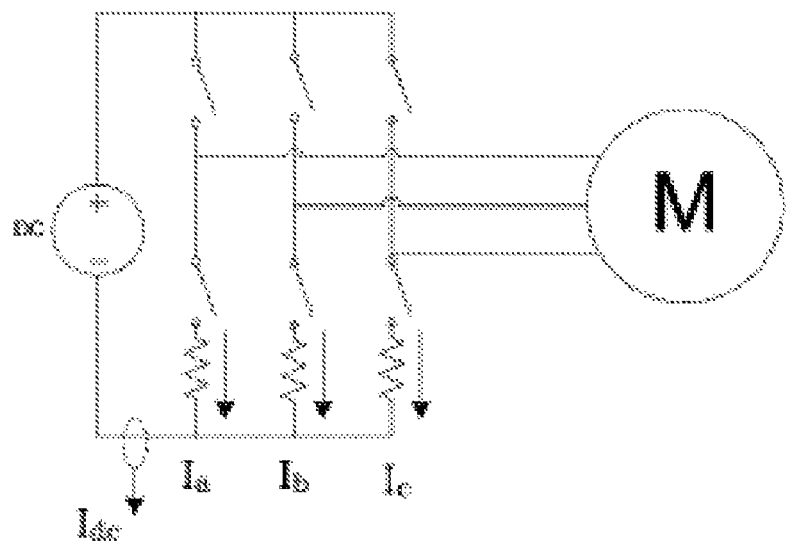
FIG. 1(a) is a schematic illustration of a conventional three-phase PWM-converter-based motor drive system using the shunt resistor method to monitor currents, in accordance with some embodiments.

The drawing figures are not necessarily to scale and certain features may be shown exaggerated in scale or in somewhat generalized or schematic form in the interest of clarity and conciseness. In the description which follows like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention, and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

In high-performance three-phase PWM converter systems, failures of current sensors disconnect the feedback loop from the system controller. Losing communication between the system controller and the power stage may have a severe impact on system performance, possibly even disastrous consequences, even under small source/load disturbances. Therefore, it is strongly desirable to have an all-scenario fault-tolerant system in critical applications that is able to maintain the same (or at least tolerable) level of performance upon the occurrence of fault until maintenance or service can be performed on the faulty system.

Redundancy-based design is one of the most widely adopted solutions to eliminate this potential hazard and to maintain the same level of performance. However, with redundant design, the system cost and volume is increased due to the increased number of sensors and their conditioning circuits. An alternative would be to reconstruct phase currents based on the survived or not failed current sensors.

Figure 1B:
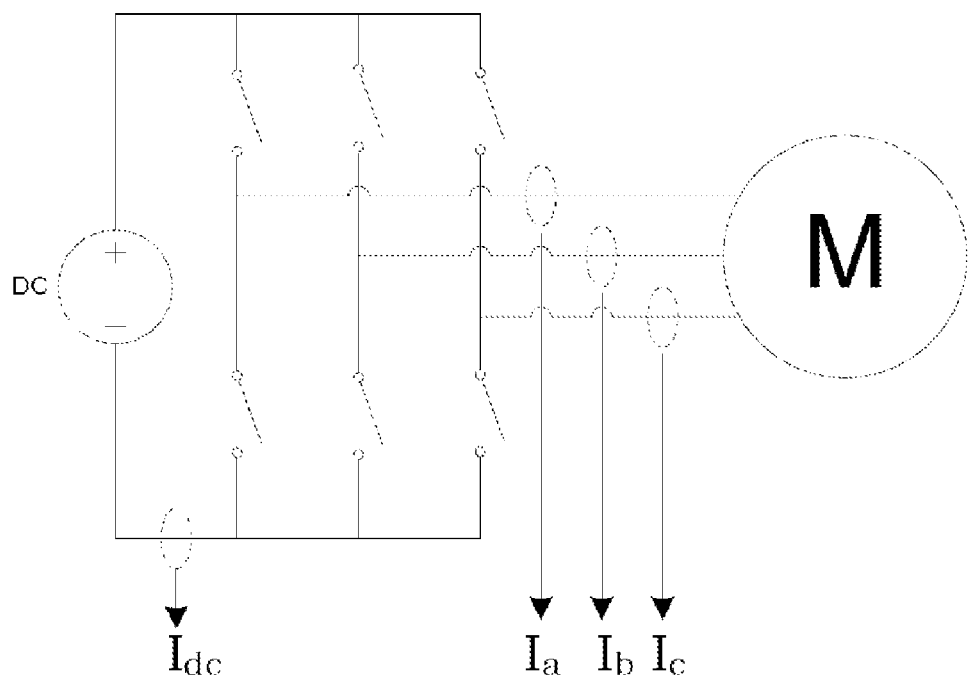
FIG. 1(b) is a schematic illustration of a conventional three-phase PWM-converter-based motor drive system using the phase measurement method to monitor currents, in accordance with some embodiments.

In a microcontroller/DSP-based controller, phase currents in three-phase load/machine can be reconstructed by examining past current values and switching states. Current values are monitored using pilot and shunt sampling resistors for phase-leg based current reconstruction. Considering a conventional three-phase PWM-converter-based motor drive system using the shunt resistor method as illustrated in FIG. 1(a) and the phase measurement method as illustrated in FIG. 1(b), four current sensors are used to monitor the dc-link current, $I_{dc}$, from a DC source and the three phase currents, $I_a$, $I_b$, and $I_c$, for maximum regulation performance for motor M. The lower case subscripts indicate measured values. Under a balanced condition, equations (1), (2), and (3) will hold, where the upper case subscripts indicate variables.

$$I_A + I_B + I_C = 0 \quad (1)$$

$$[I_A \ I_B \ I_C] \cdot \begin{bmatrix} S_a \\ S_b \\ S_c \end{bmatrix} = I_{dc} \quad (2)$$

$$S_{a,b,c} = \begin{cases} 1 \\ 0 \end{cases} \quad (3)$$

In any balanced multi-phase system, the sum of the phase currents equals zero. Equation (1) shows the sum of the phase currents for a three-phase system. Equation (2) shows that the dc-link current, $I_{dc}$, is equal to the summation of the product between the phase currents, $I_A$, $I_B$, and $I_C$, and their corresponding switching states, $S_a$, $S_b$, and $S_c$. As indicated in equation (3), the switching states can only have a value of one or zero. The value of one indicates that the Up Switch is ON and the value of zero indicates that the Up Switch is OFF.

In order to obtain three phase currents, at least one more independent equation is needed to make sure that the system equation is full rank. Under a one-sensor-fault condition, the full rank matrix for unique current solutions can be formed by direct inspection. Under a multi-sensor fault condition, if the dc-link sensor is one of the faulty sensors, the system in FIG. 1(b) can afford to lose up to two phase current sensors for exact solution of currents. However, if the dc-link sensor is one of the failed sensors, no exact solutions can be found with a two-sensor fault, and estimation techniques have to be used to reconstruct the three phase currents.

Under symmetrical space vector modulation, as indicated in Table I, the dc-link measurement can obtain the information of two different phases within a very short period of time. The first two columns in Table II indicate the relationship between the dc-link current and the phase currents under different switching states.

TABLE I

Sectors and Switching State in Symmetrical Space Vector Implementation

| Sector | Switching States | | | | | | | |
|---|---|---|---|---|---|---|---|---|
| I   | (000) | (100) | (110) | (111) | (111) | (110) | (100) | (000) |
| II  | (000) | (010) | (110) | (111) | (111) | (110) | (010) | (000) |
| III | (000) | (010) | (011) | (111) | (111) | (011) | (010) | (000) |
| IV  | (000) | (001) | (011) | (111) | (111) | (011) | (001) | (000) |
| V   | (000) | (001) | (101) | (111) | (111) | (101) | (001) | (000) |
| VI  | (000) | (100) | (101) | (111) | (111) | (101) | (100) | (000) |

TABLE II

Switching Pattern, DC-Link Current, Phase-Leg Current, and Cross-Leg Current Relationship

| $(S_a, S_b, S_c)$ | $I_{dc}$ | $I_{A0B0}$ | $I_{B0C0}$ | $I_{C0A0}$ | $I_{A1B0}$ | $I_{B1C0}$ | $I_{C1A0}$ |
|---|---|---|---|---|---|---|---|
| (0, 0, 0) | N/A | $-(I_a + I_b)$ | $-(I_b + I_c)$ | $-(I_a + I_c)$ | $I_b$ | $I_c$ | $I_a$ |
| (0, 0, 1) | $I_c$ | $-(I_a + I_b)$ | $-I_b$ | $-I_a$ | $I_b$ | N/A | $I_a + I_c$ |
| (0, 1, 0) | $I_b$ | $-I_a$ | $-I_c$ | $-(I_a + I_c)$ | N/A | $I_b + I_c$ | $I_a$ |
| (0, 1, 1) | $I_b + I_c$ | $-I_a$ | N/A | $-I_a$ | N/A | $I_b$ | $I_a + I_c$ |
| (1, 0, 0) | $I_a$ | $-I_b$ | $-(I_b + I_c)$ | $-I_c$ | $I_a + I_b$ | $I_c$ | N/A |
| (1, 0, 1) | $I_a + I_c$ | $-I_b$ | $-I_b$ | N/A | $I_a + I_b$ | N/A | $I_c$ |
| (1, 1, 0) | $I_a + I_b$ | N/A | $-I_c$ | $-I_c$ | $I_a$ | $I_b$ | N/A |
| (1, 1, 1) | N/A | N/A | N/A | N/A | $I_a$ | $I_b$ | $I_c$ |

At any switching state, except states (0, 0, 0) and (1, 1, 1), one phase current is known based on equations (1), (2), and (3). If the switching frequency is much higher (several decades) than the output current fundamental frequency, the variation of phase current during one switching period is negligible. Given the switching frequency of a three-phase inverter as $f_{sw}$, the current pulse seen from the dc-link can be as high as $6f_{sw}$, which can be observed from the space vector switching patterns in Table I. Since the phase current can be taken as constant during the time interval less than $1/f_{sw}$, three independent linear equations can be formed and unique solutions for phase currents can be obtained. Table III lists the measurable phase currents within different space vector sectors.

TABLE III

DC-Link Current Information

| Sectors | DC-link Current Information |
|---|---|
| I   | $I_a, I_a + I_b$ |
| II  | $I_b, I_a + I_b$ |
| III | $I_b, I_b + I_c$ |
| IV  | $I_c, I_b + I_c$ |

TABLE III-continued

DC-Link Current Information

| Sectors | DC-link Current Information |
|---|---|
| V  | $I_c, I_a + I_c$ |
| VI | $I_a, I_a + I_c$ |

Similar reconstruction principles apply to the shunt resistor measurement method. However, conventional sensor configurations are not all-scenario-adaptive to fault tolerant operations unless model-dependent methods are used and cannot guarantee fault tolerance under the $S^3$ scenario if the dc-link sensor fails.

Figure 2:
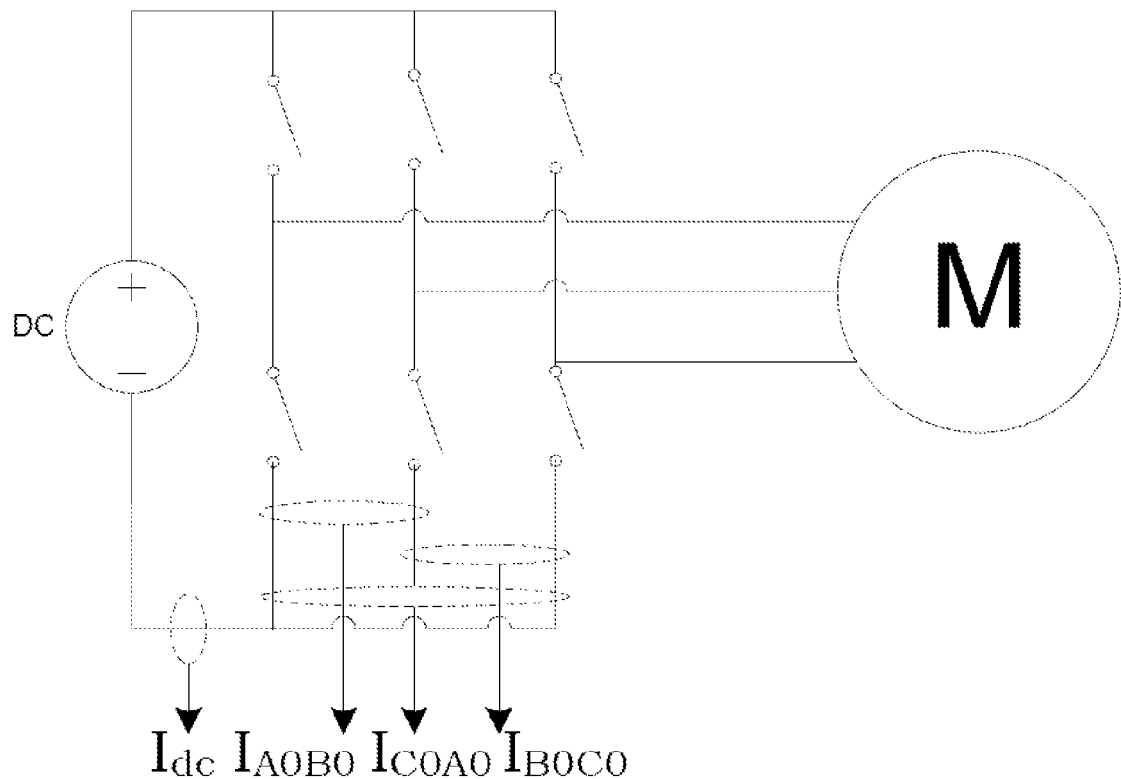
FIG. 2 is a schematic illustration of a new three-phase PWM-converter-based motor drive system using the summation of currents in adjacent phase legs to monitor currents, in accordance with some embodiments.

Some of the previous problems may be addressed by using phase-leg-based reconstruction or cross-leg-based reconstruction methods and systems. Phase-leg reconstruction and cross-leg reconstruction are new methods to improve fault tolerance in multi-phase PWM converter systems. Phase-leg reconstruction differs from the conventional shunt resistor method in that the summation of currents in adjacent phase legs are measured, as shown in FIG. 2, in accordance with some embodiments. One current sensor is used to measure the dc-link current, $I_{dc}$, from a DC source. Another current sensor is connected to the lower leg of phase A and the lower leg of phase B with proper wiring to measure the summation of phase leg current AB, $I_{A0B0}$. Similarly, a current sensor is connected to the lower leg of phase B and the lower leg of phase C with proper wiring to measure the summation of phase leg current BC, $I_{B0C0}$, and a current sensor is connected to the lower leg of phase A and the lower leg of phase C with proper wiring to measure the summation of phase leg current AC, $I_{C0A0}$. The sensors can also be configured to similarly measure the upper phase legs versus the lower phase legs or even a combination of upper and lower phase legs as long as the leg pair being measured comes from the same phase leg sections, i.e. upper or lower.

Due to the balanced feature of the three-phase system, each current measurement, $I_{A0B0}$, $I_{B0C0}$, and $I_{C0A0}$ provide the same percentage of current information for reconstruction, which can be found in columns 3-5 in Table II. As shown in Tables I, II, and IV, two phase currents can be measured with a time delay from $1/6f_{sw}$ to $1/3f_{sw}$ within each sector (switching period).

TABLE IV

Phase-Leg $I_{A0B0}$ Current Information

| Sectors | Phase-leg Current Information |
|---|---|
| I  | $-(I_a + I_b), -I_b$ |
| II | $-(I_a + I_b), -I_a$ |

TABLE IV-continued

Phase-Leg $I_{A0B0}$ Current Information

| Sectors | Phase-leg Current Information |
|---|---|
| III | $-(I_a + I_b), -I_a$ |
| IV | $-(I_a + I_b), -I_a$ |
| V | $-(I_a + I_b), -I_b$ |
| VI | $-(I_a + I_b), -I_b$ |

Since the phase current can be taken as constant during such a short period of time, as soon as the reading of the second phase current is completed, three independent equations can be formed and unique three phase currents can be obtained. Similar to the dc-link reconstruction method, the phase-leg reconstruction method is not sensor position dependent, which means phase-leg AB current measurement, $I_{A0B0}$, can be used to reconstruct all three phase currents. If phase C current needs to be reconstructed, one can see that phase C current is directly available in each space sector and no calculation is needed, as shown in Table IV. If phase A current is needed, Table V can be used to estimate and calculate the current value, where the superscript asterisks, *, indicate the value recorded from the previous valid switching state. A similar approach can be applied to phase B current reconstruction.

TABLE V

Equation Sets for Three Phase Current Reconstruction Using Phase-Leg AB Current Measurement

| Sectors | Independent equations |
|---|---|
| I | $I_A + I_B + I_C = 0; I_C = -(I_a + I_b); I_B = I_b*$ |
| II | $I_A + I_B + I_C = 0; I_C = -(I_a + I_b); I_A = I_a*$ |
| III | $I_A + I_B + I_C = 0; I_C = -(I_a + I_b); I_A = I_a*$ |
| IV | $I_A + I_B + I_C = 0; I_C = -(I_a + I_b); I_A = I_a*$ |
| V | $I_A + I_B + I_C = 0; I_C = -(I_a + I_b); I_B = I_b*$ |
| VI | $I_A + I_B + I_C = 0; I_C = -(I_a + I_b); I_B = I_b*$ |

As indicated in Table II, three phase-leg current measurements, $I_{A0B0}$, $I_{B0C0}$, and $I_{C0A0}$ provide the same amount of phase currents information in a time-shifted manner; therefore, all three phase currents can be reconstructed. Given the sensor placement in FIG. 2, the system can continue its intended service under the $S^3$ scenario. However, under a no fault condition, there is only one phase current measurable in the following four states (0,1,1), (1,0,1), (1,1,0), and (1,1,1), which indicates no exact current solutions within these states. In fact, over sampling ($6f_{sw}$) is not necessary in actual control systems; according to Tables I and II, a maximum sampling rate of $2f_{sw}$ can be applied to the system, which is sufficient for grid-tie generation and motor drive systems.

Mathematically, the phase-leg measurement method can be expressed by equations (4), (5), and (6), where $S'_i = 1 - S_i$ and i=a, b, c. Phase-leg-based measurement is the mixed mode of dc-link and shunt measurement with access to low-side commutation states.

$$[I_a \ I_b] \cdot \begin{bmatrix} S'_a \\ S'_b \end{bmatrix} = I_{A0B0} \quad (4)$$

$$[I_b \ I_c] \cdot \begin{bmatrix} S'_b \\ S'_c \end{bmatrix} = I_{B0C0} \quad (5)$$

$$[I_c \ I_a] \cdot \begin{bmatrix} S'_c \\ S'_a \end{bmatrix} = I_{C0A0} \quad (6)$$

Figure 3:
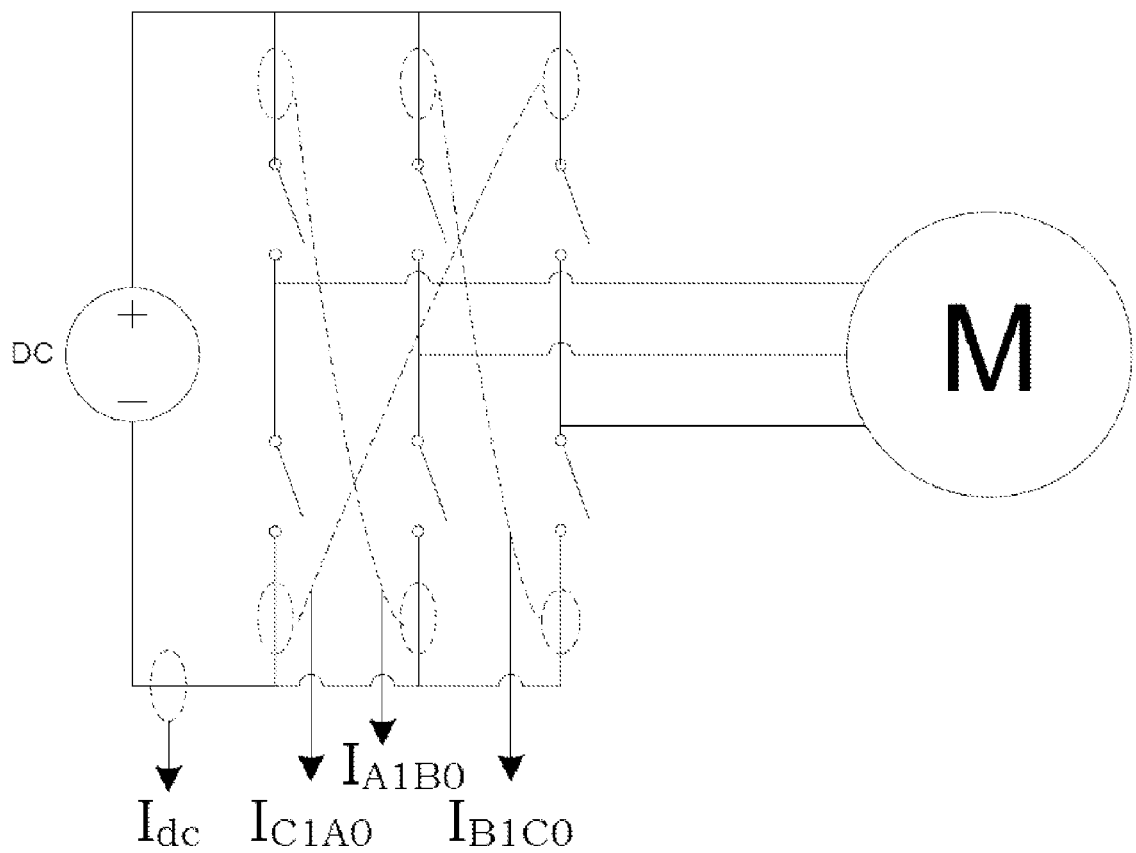
FIG. 3 is a schematic illustration of a new three-phase PWM-converter-based motor drive system using the summation of currents in cross-legs to monitor currents, in accordance with some embodiments.

DC-link measurement provides abundant information of phase currents responding to active switching states except "zero" states (0, 0, 0) and (1, 1, 1). By introducing phase-leg measurements, additional current information on state (0, 0, 0) becomes visible. However, the combination of dc-link and phase-leg measurement does not render more phase current information since phase-leg measurement can be viewed as a dissection of dc-link current with extra (0, 0, 0) state access. Also, there is no benefit to introduce an upper leg measurement on the same phase leg since summation of upper and lower phase leg currents is exactly the phase current. However, introducing the cross-leg current brings a new current measurement. As shown in FIG. 3, in accordance with some embodiments, one current sensor is used to measure the dc-link current, $I_{dc}$, from a DC source. Another current sensor is connected to the upper leg of phase A and the lower leg of phase B with proper wiring, which gives summation of cross-leg current $I_{A1B0}$. Similarly, a current sensor connected with proper wiring to the upper leg of phase B and the lower leg of phase C gives the summation of cross-leg current $I_{B1C0}$ and a current sensor connected with the proper wiring to the upper leg of phase C and the lower leg of phase A gives the summation of cross-leg current $I_{C1A0}$. The sensors can also be configured to instead measure $I_{A1C0}$, $I_{B1A0}$, and $I_{C1B0}$. Table II indicates the relationship between the switching states (column 1), the dc-link current (column 2), and the cross-leg current measurements (columns 6-8).

As can be observed, cross-leg sensor placement provides current readings into the (0, 0, 0) and (1, 1, 1) states without duplicate measurement with dc-link measurement. The cross-leg sensor measurement can be expressed by equations (7), (8), and (9).

$$[I_a \ I_b] \cdot \begin{bmatrix} S_a \\ S'_b \end{bmatrix} = I_{A1B0} \quad (7)$$

$$[I_b \ I_c] \cdot \begin{bmatrix} S_b \\ S'_c \end{bmatrix} = I_{B1C0} \quad (8)$$

$$[I_c \ I_a] \cdot \begin{bmatrix} S_c \\ S'_a \end{bmatrix} = I_{C1A0} \quad (9)$$

During the no fault condition, there are three independent equations to provide unique solution that can be directly inspected from the Table II. This indicates the over sampling capability (up to $6f_{sw}$) of the cross-leg configuration. In a one-sensor fault scenario, three independent equations can still be formed and current can be solved uniquely. Thus, system performance will not be affected by single-sensor fault. Under the $S^3$ scenario, dc-link measurement can guarantee reconstruction of all three phase currents by using the cross-leg measurement for phase currents reconstruction. As an example of the worst case, phase A current can be reconstructed when only one sensor measuring summation of upper leg B and lower leg C currents, $I_{B1C0}$, has survived. Space vector sectors and obtainable equation information through $I_{B1C0}$ measurement are listed in Table VI. Under high switching frequency, this estimation will hold.

TABLE VI

Equation Sets for Three Phase Current Reconstruction
Using B-Up and C-Low Leg Current Measurement

| Sectors | Independent equations |
| --- | --- |
| I | $I_A + I_B + I_C = 0$; $I_C = I_c$; $I_B = I_b^*$ |
| II | $I_A + I_B + I_C = 0$; $I_C = I_c$; $I_A = -(I_b^* + I_c^*)$ |
| III | $I_A + I_B + I_C = 0$; $I_C = I_c$; $I_A = -(I_b^* + I_c^*)$ |
| IV | $I_A + I_B + I_C = 0$; $I_C = I_c$; $I_B = I_b^*$ |
| V | $I_A + I_B + I_C = 0$; $I_C = I_c$; $I_B = I_b^*$ |
| VI | $I_A + I_B + I_C = 0$; $I_C = I_c$; $I_B = I_b^*$ |

Figure 4:
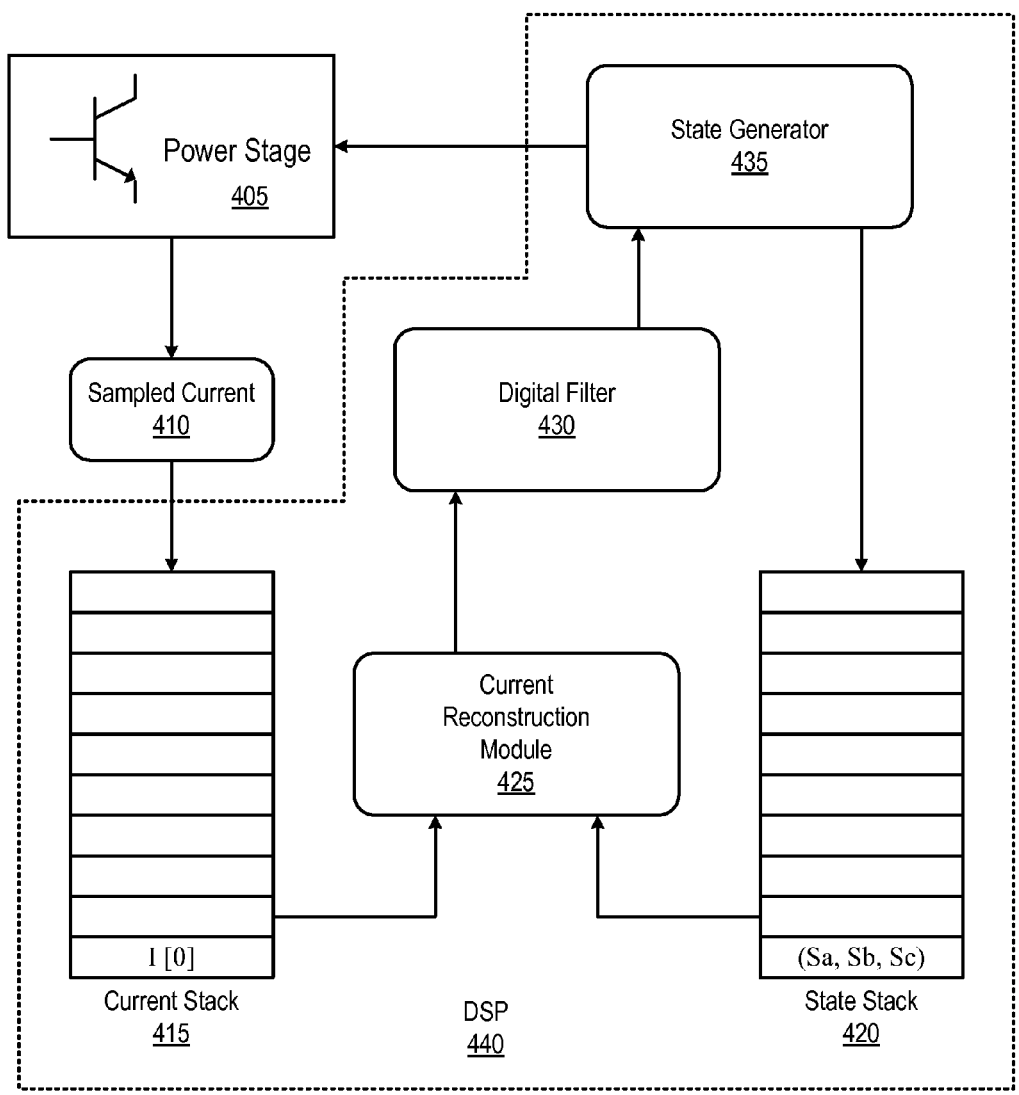
FIG. 4 is a block diagram illustrating the phase current reconstruction process, in accordance with some embodiments.

The functional blocks of the phase current reconstruction process are illustrated in FIG. 4. The current of the power stage 405 is sampled. The sampled current 410 is stored in a current stack 415. Since reconstruction of all phase currents in a faulty condition involves predicting the unknown currents based on the past records, stacks of memories are used to store the past values of current in a current stack 415 and the past values of switching states in a state stack 420. During the faulty state, the current reconstruction module 425 will check the state value to see if the current reading from the only survived sensor happens to be one of the phase currents. If yes, the program will update the particular phase current stack and use the previous record together with current reading to calculate the current of the other phases, as indicated in Tables III, V, and VI. The N/A state is always skipped so that all previous records are valid measurement values. Also, since the dc-link current and phase-leg currents are chopped current waveforms, they are extremely noisy. The reconstructed current will also be affected by the noise, although sampling instant can be properly controlled. To suppress the noise, a digital fourth-order moving average filter 430 can be implemented, as expressed in equation (10). The filtered, reconstructed phase currents are then fed to a state generator 435 and coupled back to the power stage 405 for use in AC generation and motor drives.

$$I_{ave} = \frac{1}{k+1} \sum_{i=0}^{k} I[n+i], k = 3 \quad (10)$$

The current stack 415, state stack 420, current reconstruction module 425, digital filter 430, and state generator 435 can all be programmed on control logic such as a microcontroller or digital signal processor (DSP) 440.

Figure 5:
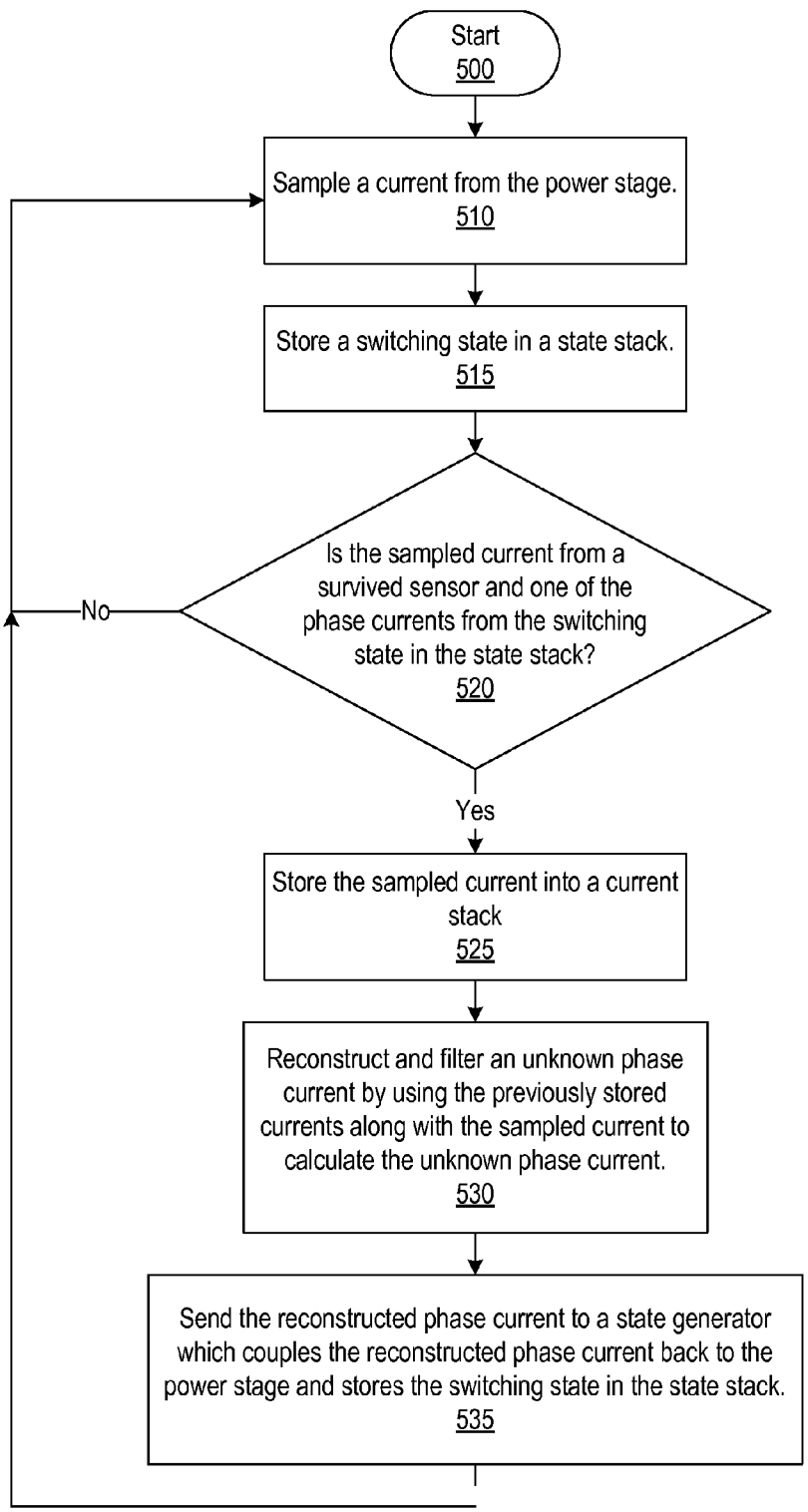
FIG. 5 is a flow diagram illustrating a method for phase current reconstruction, in accordance with some embodiments.

FIG. 5 is a flow diagram illustrating a method for phase current reconstruction, in accordance with some embodiments. Processing begins at 500 whereupon, at block 510, a current from one of the current sensors of the power stage 405 is sampled. The sampled current can be either from the current sensor monitoring the dc-link current or any one of the current sensors configured to measure either the phase-leg currents or cross-leg currents. At block 515, the switching state of the power stage is stored in a state stack 420. At decision block 520, a determination is made whether the sampled current comes from a functioning or survived sensor and whether the sampled current is one of the phase currents from the switching state in the state stack. If the sampled current is not, then processing returns to block 510 where a current is sampled from the power stage 405 and the process continues again. On the other hand, if the decision from block 520 is "yes," the sampled current is stored into a current stack 415, block 525. At block 530, reconstruction of any unknown phase current is then accomplished by using the previously stored currents along with the sampled current. For example, for a system with sensors summing cross-leg currents, if the only surviving sensor is measuring the upper leg B current plus the lower leg current C, current reconstruction module 425 uses the current measured by the survived sensor $I_{B1C0}$ plus the previously recorded phase currents stored in the current stack 415 along with the equation set of Table VI to reconstruct the phase A current. Alternatively, for a system with sensors summing adjacent phase legs, Table V can be used along with the current measurement from survived sensor $I_{A0B0}$ and the previously recorded phase currents to reconstruct the phase A current. The reconstructed phase current is also filtered to suppress the noise resulting from the measured chopped current waveforms. Finally at block 535, the reconstructed phase current is sent to a state generator where the phase current is coupled back to the power stage and the corresponding switching state is stored in the state stack.

Figure 6A:
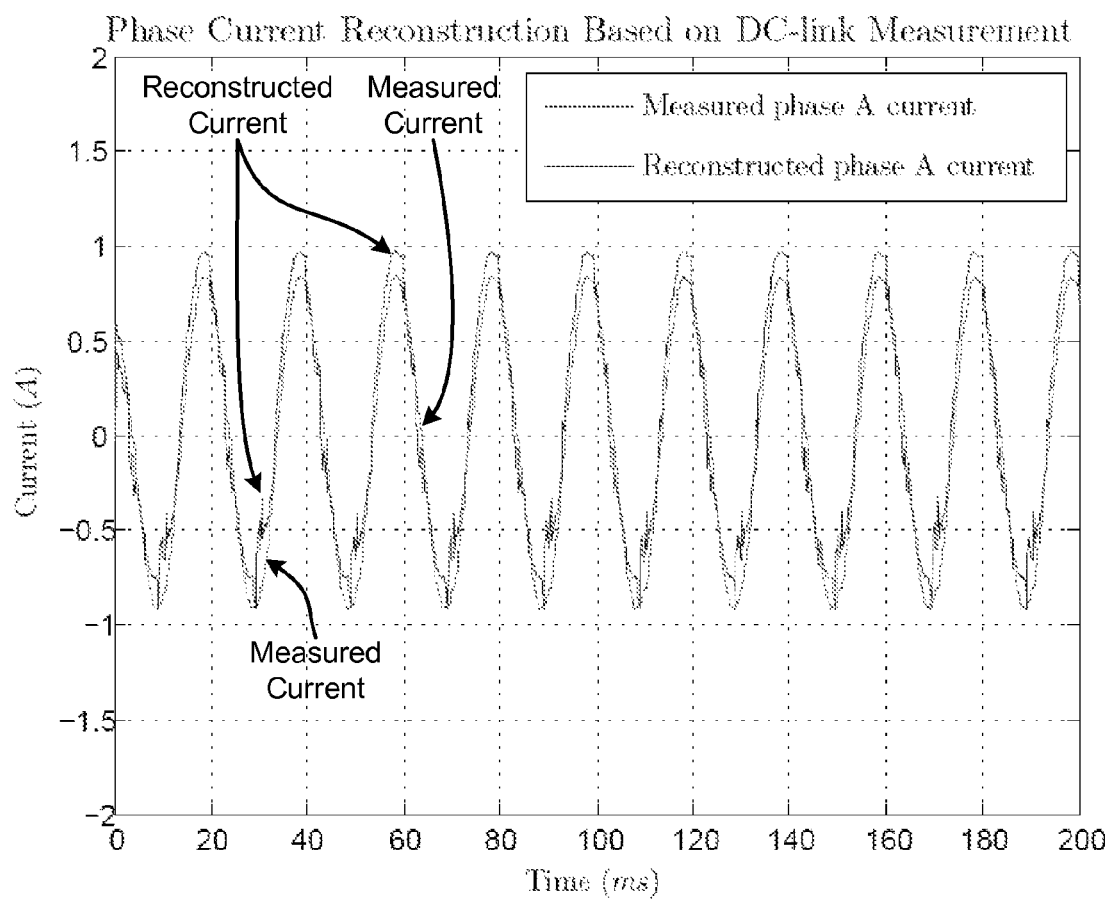
FIG. 6(a) is a graph of the reconstructed phase current based on dc-link current under the $S^3$ scenario, in accordance with some embodiments.
Figure 6B:
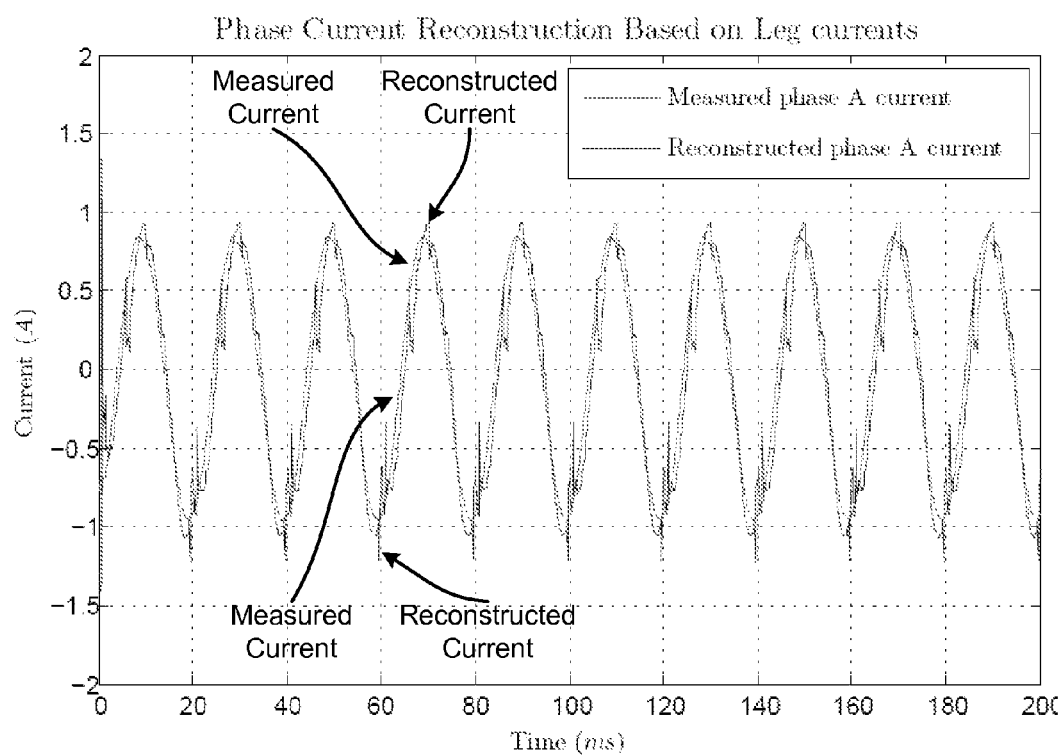
FIG. 6(b) is a graph of the reconstructed phase current based on the summation of currents in adjacent phase legs under the $S^3$ scenario, in accordance with some embodiments.
Figure 6C:
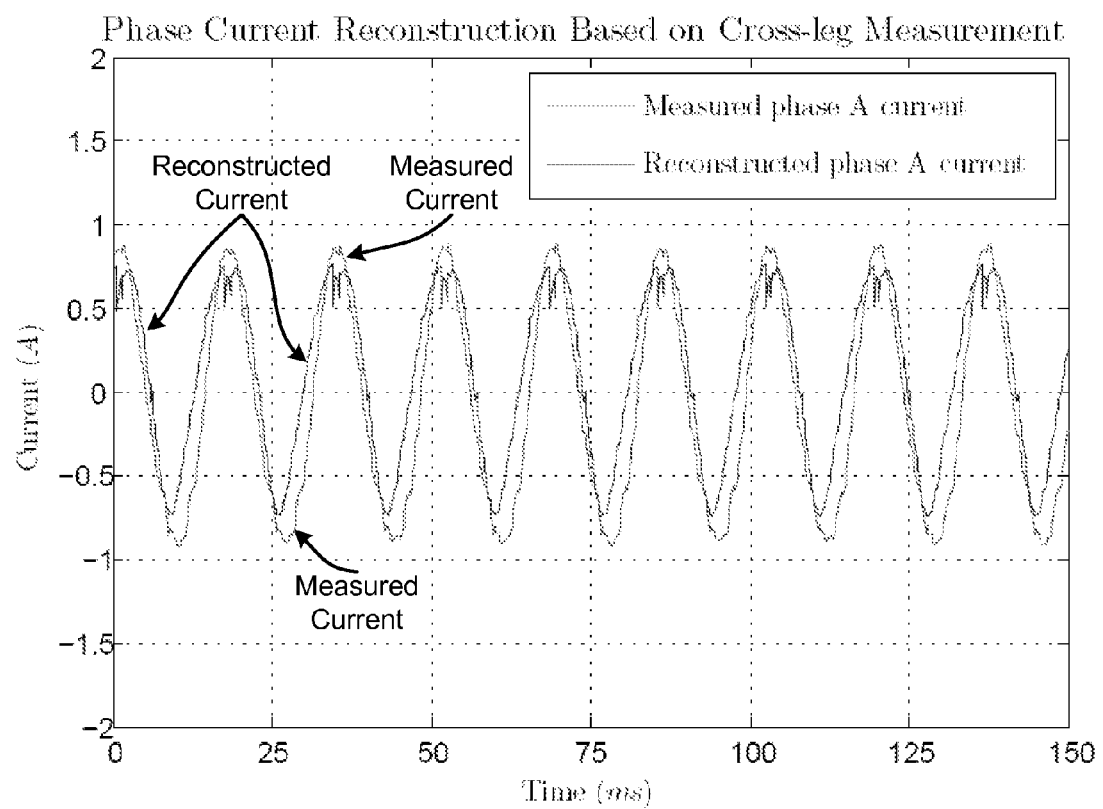
FIG. 6(c) is a graph of the reconstructed phase current based on the summation of currents in cross-legs under the $S^3$ scenario, in accordance with some embodiments.

To test the reconstruction methods under the $S^3$ scenario, an all-scenario fault tolerant PWM converter system using a TMS320F2812 DSP is demonstrated with an RL load. Hall-effect current sensors with the same rating as in conventional phase measurement are used since phase-leg and cross-leg measurements only introduce summation of currents from different phases. The worst-case scenario, the $S^3$ scenario, is tested for the three reconstruction methods, measuring the dc-link current $I_{dc}$, measuring the phase-leg current $I_{A0B0}$, and measuring the cross-leg current $I_{B1C0}$. Experimental results indicate that under the $S^3$ scenario, phase current can be reconstructed with less than 15% of maximum phase current error and tolerable phase shift error, as indicated in FIGS. 6(a), 6(b), and 6(c), respectively for reconstruction based on dc-link current, phase-leg current, and cross-leg current.

In light of the principles and example embodiments described and illustrated herein, it will be recognized that the example embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure also described various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A three-phase pulse-width-modulated (PWM) converter system, comprising:
   a power stage comprising:
      a first phase leg comprising an upper switch and a lower switch;
      a second phase leg comprising an upper switch and a lower switch;
      a third phase leg comprising an upper switch and a lower switch;
      a first current sensor configured to measure a dc-link current;
      a second current sensor, wherein the second current sensor is configured to measure (a) the current in the first leg plus the current in the second leg, (b) the current in the upper switch of the first phase leg plus the current in the upper switch of the second phase leg, (c) the current in the lower switch of the first phase leg plus the current in the lower switch of the second phase leg, (d) the current in the upper switch of the first phase leg plus the current in the lower switch of the second phase leg, or the current in the lower switch of the first phase leg plus the current in the upper switch of the second phase leg;
      a third current sensor, wherein the third current sensor is configured to measure (a) the current in the second leg plus the current in the third leg, (b) the current in the upper switch of the second phase leg plus the current in the upper switch of the third phase leg, (c) the current in the lower switch of the second phase leg plus the current in the lower switch of the third phase leg, (d) the current in the upper switch of the second phase leg plus the current in the lower switch of the third phase leg, or the current in the lower switch of the second phase leg plus the current in the upper switch of the third phase leg; and
      a fourth current sensor, wherein the fourth current sensor is configured to measure (a) the current in the first leg plus the current in the third leg, (b) the current in the upper switch of the first phase leg plus the current in the upper switch of the third phase leg, (c) the current in the lower switch of the first phase leg plus the current in the lower switch of the third phase leg, (d) the current in the upper switch of the first phase leg plus the current in the lower switch of the third phase leg, or the current in the lower switch of the first phase leg plus the current in the upper switch of the third phase leg; and
   a control logic configured to:
      sample a current from the power stage;
      store a switching state in a state stack;
      store the sampled current into a current stack if the sampled current comes from a survived sensor and is one of the phase currents from the switching state in the state stack; and
      construct an unknown phase current by using the previously stored currents along with the sampled current to calculate the unknown phase current.

2. The three-phase PWM converter system of claim 1, wherein the control logic is further configured to send the reconstructed phase current to a state generator configured to couple the reconstructed phase current back to the power stage.

3. The three-phase PWM converter system of claim 1, wherein the control logic is further configured (a) to send the reconstructed phase current to a state generator configured to couple the reconstructed phase current back to the power stage and (b) to store the switching state in the state stack.

4. The three-phase PWM converter system of claim 2, wherein the control logic comprises a digital filter configured to suppress noise of the reconstructed phase current before the reconstructed phase current is sent to the state generator.

5. The three-phase PWM converter system of claim 4, wherein the digital filter comprises a digital fourth-order moving average filter.

6. The three-phase PWM converter system of claim 1, wherein the construction of the unknown phase current is calculated according to equations of:

$$[I_a \ I_b] \cdot \begin{bmatrix} S'_a \\ S'_b \end{bmatrix} = I_{A0B0}$$

$$[I_b \ I_c] \cdot \begin{bmatrix} S'_b \\ S'_c \end{bmatrix} = I_{B0C0}$$

$$[I_c \ I_a] \cdot \begin{bmatrix} S'_c \\ S'_a \end{bmatrix} = I_{C0A0}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i=1-S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a phase leg current relationship.

7. The three-phase PWM converter system of claim 1, wherein the construction of the unknown phase current is calculated according to equations of:

$$[I_a \ I_b] \cdot \begin{bmatrix} S_a \\ S_b \end{bmatrix} = I_{A1B1}$$

$$[I_b \ I_c] \cdot \begin{bmatrix} S_b \\ S_c \end{bmatrix} = I_{B1C1}$$

$$[I_c \ I_a] \cdot \begin{bmatrix} S_c \\ S_a \end{bmatrix} = I_{C1A1}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i=1-S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a phase leg current relationship.

8. The three-phase PWM converter system of claim 1, wherein the construction of the unknown phase current is calculated according to equations of:

$$[I_a \; I_b] \cdot \begin{bmatrix} S_a \\ S'_b \end{bmatrix} = I_{A1B0}$$

$$[I_b \; I_c] \cdot \begin{bmatrix} S_b \\ S'_c \end{bmatrix} = I_{B1C0}$$

$$[I_c \; I_a] \cdot \begin{bmatrix} S_c \\ S'_a \end{bmatrix} = I_{C1A0}$$

I is a sensed phase leg current; S is a binary switch state; a, b and c are first, second and third phase legs; and $I_a$, $I_b$, $I_c$ and are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i = 1 - S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a cross-leg current relationship.

9. The three-phase PWM converter system of claim 1, wherein the construction of the unknown phase current is calculated according to equations of:

$$[I_a \; I_b] \cdot \begin{bmatrix} S'_a \\ S_b \end{bmatrix} = I_{A0B1}$$

$$[I_b \; I_c] \cdot \begin{bmatrix} S'_b \\ S_c \end{bmatrix} = I_{B0C1}$$

$$[I_c \; I_a] \cdot \begin{bmatrix} S'_c \\ S_a \end{bmatrix} = I_{C0A1}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i = 1 - S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a cross-leg current relationship.

10. A method for phase current reconstruction, the method comprising:
sampling a current from a power stage comprising:
a first phase leg comprising an upper switch and a lower switch;
a second phase leg comprising an upper switch and a lower switch;
a third phase leg comprising an upper switch and a lower switch;
a first current sensor configured to measure a dc-link current;
a second current sensor, wherein the second current sensor is configured to measure (a) the current in the first leg plus the current in the second leg, (b) the current in the upper switch of the first phase leg plus the current in the upper switch of the second phase leg, (c) the current in the lower switch of the first phase leg plus the current in the lower switch of the second phase leg, (d) the current in the upper switch of the first phase leg plus the current in the lower switch of the second phase leg, or the current in the lower switch of the first phase leg plus the current in the upper switch of the second phase leg;
a third current sensor, wherein the third current sensor is configured to measure (a) the current in the second leg plus the current in the third leg, (b) the current in the upper switch of the second phase leg plus the current in the upper switch of the third phase leg, (c) the current in the lower switch of the second phase leg plus the current in the lower switch of the third phase leg, (d) the current in the upper switch of the second phase leg plus the current in the lower switch of the third phase leg, or the current in the lower switch of the second phase leg plus the current in the upper switch of the third phase leg; and
a fourth current sensor, wherein the fourth current sensor is configured to measure (a) the current in the first leg plus the current in the third leg, (b) the current in the upper switch of the first phase leg plus the current in the upper switch of the third phase leg, (c) the current in the lower switch of the first phase leg plus the current in the lower switch of the third phase leg, (d) the current in the upper switch of the first phase leg plus the current in the lower switch of the third phase leg, or the current in the lower switch of the first phase leg plus the current in the upper switch of the third phase leg;
storing a switching state in a state stack;
storing the sampled current into a current stack if the sampled current comes from a survived sensor and is one of the phase currents from the switching state in the state stack; and
constructing an unknown phase current by using the previously stored currents along with the sampled current to calculate the unknown phase current.

11. The method of claim 10, further comprising sending the reconstructed phase current to a state generator configured to couple the reconstructed phase current back to the power stage.

12. The method of claim 10, further comprising sending the reconstructed phase current to a state generator configured to couple the reconstructed phase current back to the power stage and to store the switching state in the state stack.

13. The method of claim 11, further comprising filtering the reconstructed phase current with a digital filter prior to sending the reconstructed phase current to the state generator.

14. The method of claim 13, wherein the digital filter comprises a digital fourth-order moving average filter.

15. The method of claim 10, wherein the reconstruction of the unknown phase current is calculated according to equations of:

$$[I_a \ I_b] \cdot \begin{bmatrix} S'_a \\ S'_b \end{bmatrix} = I_{A0B0}$$

$$[I_b \ I_c] \cdot \begin{bmatrix} S'_b \\ S'_c \end{bmatrix} = I_{B0C0}$$

$$[I_c \ I_a] \cdot \begin{bmatrix} S'_c \\ S'_a \end{bmatrix} = I_{C0A0}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i = 1-S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a phase leg current relationship.

16. The method of claim 10, wherein the construction of the unknown phase current is calculated according to equations of:

$$[I_a \ I_b] \cdot \begin{bmatrix} S_a \\ S_b \end{bmatrix} = I_{A1B1}$$

$$[I_b \ I_c] \cdot \begin{bmatrix} S_b \\ S_c \end{bmatrix} = I_{B1C1}$$

$$[I_c \ I_a] \cdot \begin{bmatrix} S_c \\ S_a \end{bmatrix} = I_{C1A1}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i = 1-S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a phase leg current relationship.

17. The method of claim 10, wherein the construction of the unknown phase current is calculated according to equations of:

$$[I_a \ I_b] \cdot \begin{bmatrix} S_a \\ S'_b \end{bmatrix} = I_{A1B0}$$

$$[I_b \ I_c] \cdot \begin{bmatrix} S_b \\ S'_c \end{bmatrix} = I_{B1C0}$$

-continued $$[I_c \ I_a] \cdot \begin{bmatrix} S_c \\ S'_a \end{bmatrix} = I_{C1A0}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i = 1-S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a cross-leg current relationship.

18. The method of claim 10, wherein the construction of the unknown phase current is calculated according to equations of:

$$[I_a \ I_b] \cdot \begin{bmatrix} S'_a \\ S_b \end{bmatrix} = I_{A0B1}$$

$$[I_b \ I_c] \cdot \begin{bmatrix} S'_b \\ S_c \end{bmatrix} = I_{B0C1}$$

$$[I_c \ I_a] \cdot \begin{bmatrix} S'_c \\ S_a \end{bmatrix} = I_{C0A1}$$

I is a sensed phase leg current; S is a binary switch state; a, b and c are first, second and third phase legs; and $I_a$, $I_b$, and $I_c$ are sensed currents of corresponding first, second and third phase legs; $S_a$, $S_b$ and $S_C$ are switching states of upper and lower switches of the corresponding first, second and third phase legs; and where the binary switch state is the relationship of $S_i$ and $S'_i = 1-S_i$, for i=a, b, c; and where a calculated result consists of the product of the switching states and sensed phase leg currents of the first, second and third phase legs as A, B, C; with a binary switch state value; the calculated result expressing summation of the sensed phase leg currents in a cross-leg current relationship.

19. An N phase PWM converter system comprising:
a power stage comprising:
  N phase legs, each phase leg comprising an upper switch and a lower switch, where N is greater than 2;
  a first current sensor configured to measure a dc-link current;
  N current sensors configured to measure N summations of currents for the power stage; and
control logic configured to perform operations comprising:
  sampling a current from one of said N current sensors;
  storing a switching state of the power stage in a state stack;
  automatically determining whether the sampled current comes from a survived sensor;
  automatically determining whether the sampled current is one of the phase currents from the switching state in the state stack;
  in response to determinations that the sampled current comes from a survived sensor and the sampled current is one of the phase currents from the switching state in the state stack, automatically storing the sampled current into a current stack; and constructing an unknown phase current by using one or more of the previously stored currents along with the sampled current to calculate the unknown phase current.

20. An N phase PWM converter system according to claim 19, wherein the control logic is configured to perform further operations comprising:

sending the reconstructed phase current to a state generator configured to couple the reconstructed phase current to the power stage.

21. An N phase PWM converter system according to claim 19, wherein the control logic is configured to perform further operations comprising:

sending the reconstructed phase current to a state generator configured (a) to couple the reconstructed phase current to the power stage and (b) to store the switching state in the state stack.

22. An N phase PWM converter system according to claim 19, wherein the control logic is configured to construct the unknown phase current by using a formula substantially in the form of:

$$[I_2 \cdots I_N]\begin{bmatrix} S'_2 \\ S'_3 \\ \cdots \\ S'_N \end{bmatrix} = I_{2'\ldots N'}$$

$$[I_1\ I_3 \cdots I_N]\begin{bmatrix} S'_1 \\ S'_3 \\ \cdots \\ S'_N \end{bmatrix} = I_{1'3'\ldots N'}$$

$$\vdots$$

$$[I_1 \cdots I_{N-1}]\begin{bmatrix} S'_1 \\ S'_2 \\ \cdots \\ S'_{N-1} \end{bmatrix} = I_{1'\ldots N-1'}$$

I is a sensed phase leg current; S is a binary switch state; 1, 2 3, through N and N−1 are first, second, third through N and N−1 phase legs; and $I_1$, $I_2$, $I_3$ through $I_N$ are sensed currents of corresponding first, second and third through N phase legs; $S_1$, $S_2$, $S_3$ through $S_N$ are switching states of upper and lower switches of the corresponding first, second, third through N and N−1 phase legs; and where the binary switch state is the relationship of $S_i$ and $S'_i=1-S_i$, for i=1, 2, 3, through N and N−1; and where a calculated result consists of the product of the switching states and sensed phase leg currents of the first, second, third through N and N−1 phase legs; with a binary switch state value; the calculated result expressing summation of the sensed phase leg currents in a phase leg current relationship.

* * * * *